(12) United States Patent
Jackson

(10) Patent No.: US 7,878,123 B2
(45) Date of Patent: Feb. 1, 2011

(54) SINGLE RAIL FILM DOLLY AND SLIDER

(76) Inventor: Jason Jackson, 9 Blackburn Rd., Sewickley, PA (US) 15143

( * ) Notice: Subject to any disclaimer, the term of this patent is extended or adjusted under 35 U.S.C. 154(b) by 269 days.

(21) Appl. No.: 12/102,671

(22) Filed: Apr. 14, 2008

(65) Prior Publication Data

US 2008/0257199 A1 Oct. 23, 2008

Related U.S. Application Data

(60) Provisional application No. 60/923,240, filed on Apr. 13, 2007.

(51) Int. Cl.
*B61B 13/04* (2006.01)
*B61F 9/00* (2006.01)
*B60R 11/04* (2006.01)

(52) U.S. Cl. .......... 105/144; 105/153; 104/107; 104/119; 104/245

(58) Field of Classification Search .......... 104/89, 104/93–95, 106, 107, 109, 118–120, 242, 104/244–247; 105/141, 144, 145, 153, 156, 105/170
See application file for complete search history.

(56) References Cited

U.S. PATENT DOCUMENTS 2,920,581 A * 1/1960 Cook et al. .................. 104/93
4,699,484 A * 10/1987 Howell et al. ............... 352/243
4,952,953 A * 8/1990 Ridderstolpe et al. ....... 396/428
5,231,932 A * 8/1993 Enderlein et al. ........... 104/162
5,555,814 A * 9/1996 Burkhalter et al. .......... 104/107
5,974,978 A * 11/1999 Brown et al. ............... 104/304
2003/0075070 A1* 4/2003 Spielberg et al. ....... 104/130.01
2005/0252406 A1* 11/2005 Nilsen ........................ 104/106
2009/0266905 A1* 10/2009 Rosen ....................... 238/10 R
2009/0315288 A1* 12/2009 Hernandez ................ 280/79.3

FOREIGN PATENT DOCUMENTS

FR 2679316 A1 * 1/1993
WO WO 2007145542 A1 * 12/2007

* cited by examiner

*Primary Examiner*—S. Joseph Morano
*Assistant Examiner*—Zachary Kuhfuss
(74) *Attorney, Agent, or Firm*—The Webb Law Firm

(57) ABSTRACT

A single rail film dolly and slider includes a substantially V-shaped rail arrangement and a guide arrangement. The V-shaped rail arrangement is adapted to be secured to a tripod. The guide arrangement includes a plurality of wheels, wherein a first portion of the plurality of wheels frictionally engages an interior side of the V-shaped rail arrangement and a second portion of the plurality of wheels frictionally engages an exterior side of the V-shaped rail arrangement. The guide arrangement is adapted to accommodate a camera mounted thereon.

16 Claims, 3 Drawing Sheets

_US 7,878,123 B2_

SINGLE RAIL FILM DOLLY AND SLIDER

CROSS REFERENCE TO RELATED APPLICATIONS

This application claims the benefit of U.S. Provisional Patent Application No. 60/923,240 filed Apr. 13, 2007, and entitled "Single Rail Film Dolly and Slider," the contents of which are incorporated herein by reference.

BACKGROUND OF THE INVENTION

1. Field of the Invention

The present invention relates to a camera-related component and, more particularly, to a film dolly and slider.

2. Description of Related Art

Dollies are used for a variety of camera recordings or live-camera captures including feature films, television programming, commercials, music videos, and independent shorts. Dollies are considered the workhorse of movie-making. Dollies are available in a variety of sizes and weights and may offer customized functionality specific to a filming application or shots. The disadvantages associated with prior art dollies include the price (if one is able to purchase a dolly) or the rental fee, as well as the price for the dolly grip to man and control the dolly. The fundamental flaw with existing dollies is the weight and bulk associated therewith. Thus, such dollies are difficult to use in narrow environment, such as thin hallways, and over uneven ground, especially over sand. Furthermore, it is difficult to efficiently transport such prior art dollies between locations. Most of the time, a location is picked or built depending on the equipment needed to create the shot. Therefore, a set location is built around the camera equipment utilizing prior art dollies.

It is, therefore, desirable to overcome the above problems and others by providing an improved film dolly and slider.

SUMMARY OF THE INVENTION

To overcome the deficiencies of the prior art, what is needed, and has not heretofore been developed, is a film dolly and slider that mimics and simplifies a professional theatrical film dolly move. To this end, the film dolly and slider of the present invention is a versatile and lightweight single rail system for effecting smooth, quiet camera movement over the rockiest of terrain.

In accordance with one aspect of the present invention, a film camera slider and dolly includes (a) a rail arrangement having a first substantially planar element and a second substantially planar element positioned in an angled relation to each other, wherein the first and second planar elements each have a respective interior and exterior side; and (b) a guide arrangement having a first plurality of wheels and a second plurality of wheels positioned in an angled relation to each other, wherein at least a respective first wheel of each of the first and second plurality of wheels is positioned to frictionally engage the respective interior side of the first and second planar elements.

At least a respective second wheel of each of the first and second plurality of wheels may be positioned to frictionally engage the respective exterior side of the first and second planar elements, wherein the first planar element is situated between the first and second wheel of the first plurality of wheels and the second planar element is situated between the first and second wheel of the second plurality of wheels. A respective third wheel of each of the first and second plurality of wheels may be positioned to frictionally engage the respective interior side of the first and second planar elements.

The guide arrangement may include a third substantially planar element and a fourth substantially planar element having the first and second plurality of wheels respectively mounted thereon. The guide arrangement includes means for securing a camera thereto, such as a throughbore defined within an area where the third and fourth planar elements are joined.

The third and fourth planar elements may include a substantially planar bridging element joining the third planar element to the fourth planar element. Another means for securing the camera includes a substantially spherical element having a throughbore or threaded hole defined therein that is used in conjunction with a ball and socket arrangement for allowing rotational movement of the spherical element. The ball and socket arrangement may include a hole defined within the planar bridging element and sized to receive a portion of the spherical element, and compression inducing means for holding the spherical element within the hole and adapted to apply frictional force against the spherical element.

The third and fourth planar elements each include means for adjusting the distance of the respective second wheel in relation to the respective first and second planar elements, whereby the frictional resistance thereagainst by the respective second wheel is adjustable. At least one of the wheels of the first or second plurality of wheels may include means for selectively stopping the rotational movement thereof.

The rail arrangement may include means for attaching a tripod thereto. For example, the rail arrangement may include one or more holes or a groove extending along the length of the rail arrangement for securing a base thereto. The base may also be secured to the exterior side of the first and second planar elements. The rail arrangement may include another base secured to the exterior side of the first and second planar elements. The rail arrangement may include at least one stop attached to the first or second planar elements to prevent at least one of the wheels of the first or second plurality of wheels from moving past an end of the rail arrangement.

The dolly may include an electrical motor configured to impart rotational movement on at least one of the wheels of the first plurality of wheels or the second plurality of wheels. An actuator may be wired or wirelessly connected to the electrical motor to transmit electrical signals thereto representative of a predetermined rotational movement of the at least one of the wheels of the first plurality of wheels or the second plurality of wheels.

For purposes of semantics clarification, it is to be understood that the present invention is embodied as a slider when no length is added to the rail arrangement. However, upon the addition of rails, in order to extend linear movement, the present invention may be referred to as a dolly. As the claims of the present invention do not limit the length of the rail arrangement, the present invention has been claimed in the context of a dolly, however, this is not to be interpreted as limiting any of the claimed structural aspects or functionality.

Prior art camera movement equipment, such as that offered by Chapman-Leonard Studio Equipment, Inc., includes a dolly that is used for most camera movements, and a slider that is used to compensate for dolly moves that miss their mark or to simulate smaller movements. Such a slider, also known as an Over Saver, may be mounted atop a dolly to allow for greater mobility for the camera. Assuming a dolly operator misses his mark, the slider allows the camera man to adjust the camera separate from the dolly. The present invention may serve as a dolly or slider, or may be mounted on a prior art dolly and serve a similar function as a prior art slider.

However, among other things, unlike Chapman's dolly, a prosumer may use the invention at approximately a quarter of the cost associated with the Chapman dolly while accomplishing similar smooth camera movements. In addition to the difference in structural features, the dolly of the present invention may be further distinguished over a prior art dolly known as The Slider™. The Slider™ is only available in minimal 4' lengths and is only equipped to handle high-end professional film cameras. In contrast, the present invention may be configured for interchangeable varied lengths and may accommodate multiple consumer and professional cameras, or even lights.

The film slider and dolly of the present invention allows for quick and easy set-up. Set-up time for a prior art dolly involves laying down, leveling, and cleaning the track, mounting the dolly to the track, and finally mounting the camera to practice a move typically takes just under an hour. In contrast, the slider of the present invention takes just 5-10 minutes to set up, thereby allowing for more time to practice each shot, and ultimately obtaining all of a director's shot list. The slider of the present invention substitutes a normal boring pan with a more dramatic actual camera move. The slider may be used for smaller camera moves, which in an editing bay, may appear as huge moves.

The rugged durability of the slider enables it to accommodate 100+ lbs. of camera weight and mobility while remaining steady and smooth. The rail may be positioned to incline stairs at any angle, including vertically up a wall. Alternatively, the rail may be inverted to allow the camera to be mounted in an underneath orientation. The rail may be secured by a speed rail to the front of a car hood, for process trailers, for example. As portability is essential for a cameraman, the invention provides lightweight mobility over tight terrain and easy adjustability for all camera types via a Mitchell Plate Adapter or an appropriately-sized plastic pipe fitting.

The present invention allows the filmmaker to move the camera around an existing location instead of building a set location around the camera equipment. Its lightweight and versatility makes this invention perfect for run-and-gun or guerilla-style movie making, as well as electronic news gathering, documentaries, and independent shorts. The slider of the present invention may be configured to accommodate a multi-camera setup on a single rail. For example, such a set-up may be used for 3-D shots and studio camera set-ups where two cameras are used for one shot. It is envisioned that the slider is to be used in prosumer/video camera markets and low-end productions, however, this is not to limit the scope of the invention.

Still other desirable features of the invention will become apparent to those of ordinary skill in the art upon reading and understanding the following detailed description, taken with the accompanying drawings, wherein like reference numerals represent like elements throughout.

DETAILED DESCRIPTION OF THE INVENTION

The present invention will now be described with reference to the accompanying figures. It is to be understood that the specific system illustrated in the attached figures and described in the following specification is simply an exemplary embodiment of the present invention. Hence, specific dimensions and other physical characteristics related to the embodiments disclosed herein are not to be considered as limiting.

Figure 1:
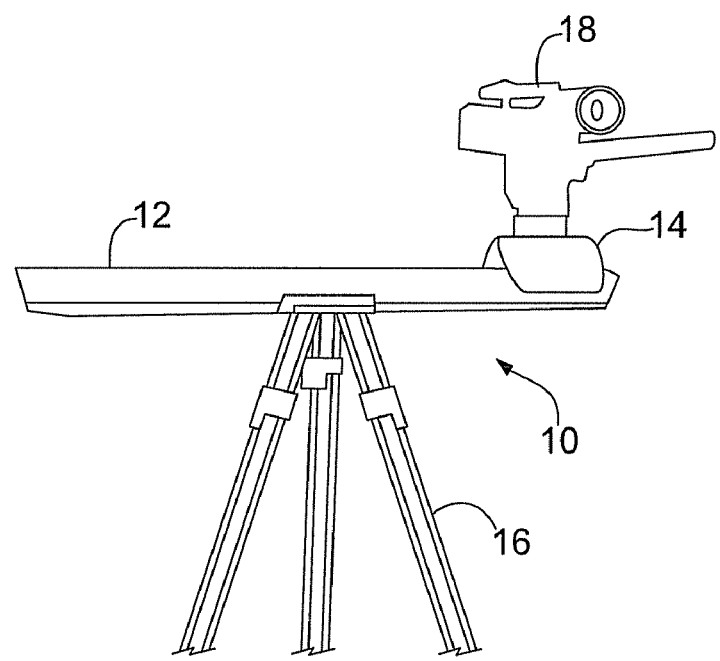
FIG. 1 is a side plan view of a film camera dolly including a rail arrangement and a guide arrangement, wherein the rail arrangement is attached to a tripod and a camera is secured to the guide arrangement, in accordance with the present invention.

An exemplary embodiment of the present invention is depicted in FIGS. 1-5. With reference to FIG. 1, a film camera dolly 10 includes a rail arrangement 12 and a guide arrangement 14. The rail arrangement 12 may be attached to a tripod 16 and a camera 18 may be secured to the guide arrangement 14.

Figure 2:
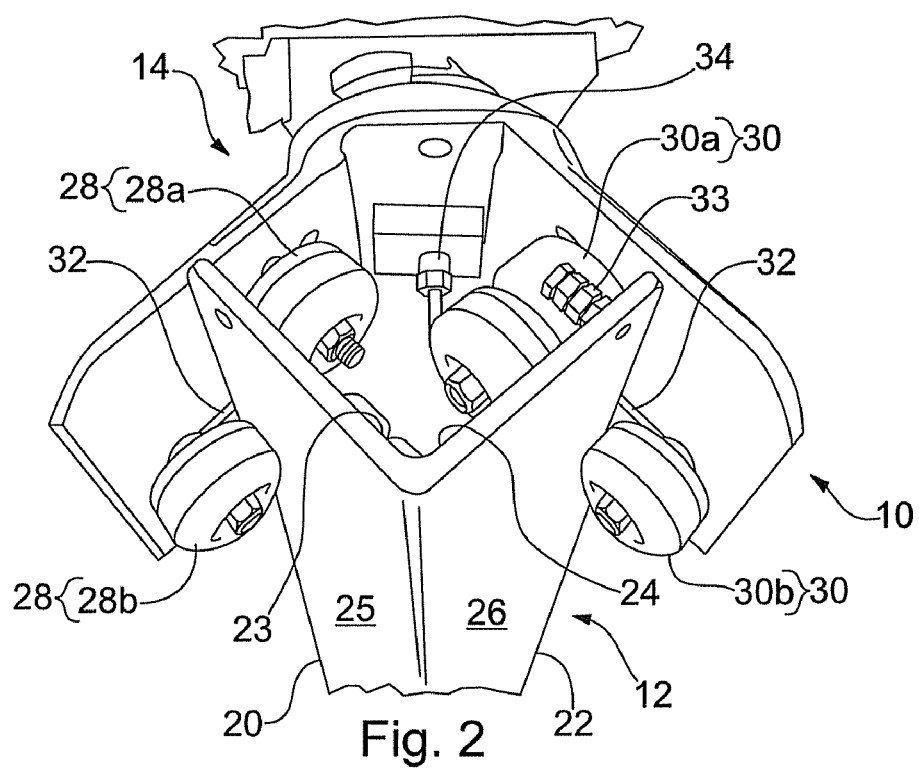
FIG. 2 is a front perspective view of the rail arrangement and the guide arrangement assembled.
Figure 3:
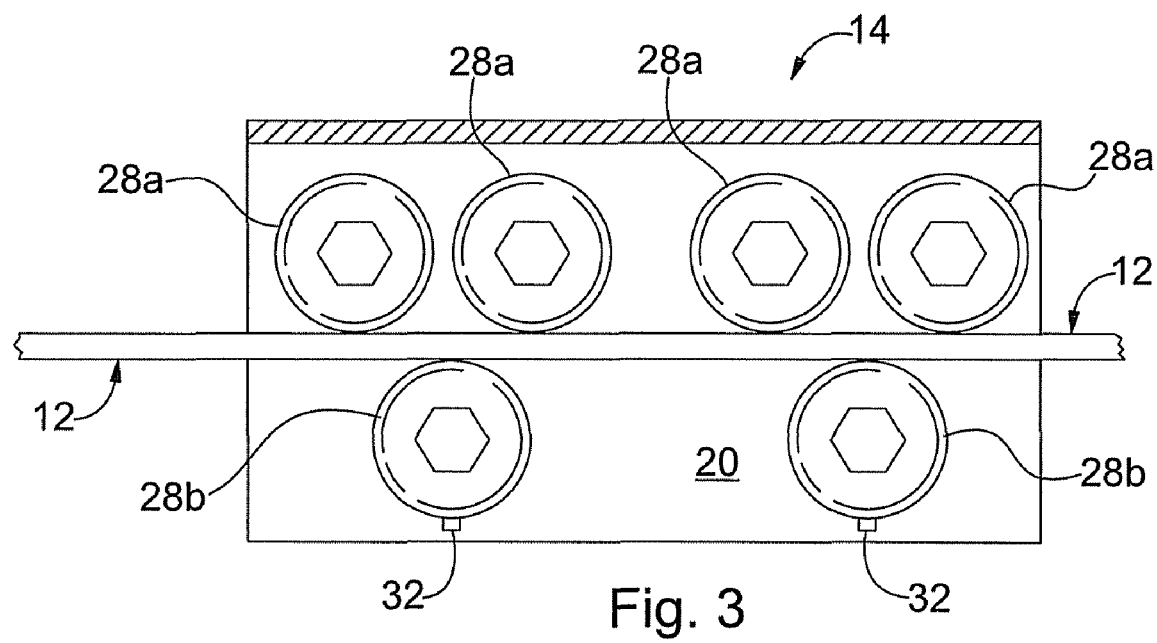
FIG. 3 is a side schematic view of an interior side of the guide arrangement.

As shown in FIG. 2, the rail arrangement 12 may be embodied as a substantially V-shaped design having a first substantially planar element 20 and a second substantially planar element 22 positioned in an angled relation to each other. The first and second planar elements 20, 22 each have a respective interior side 23, 24 and exterior side 25, 26. The guide arrangement 14 includes a first plurality of wheels 28 and a second plurality of wheels 30 positioned in an angled relation to each other. In a desirable embodiment, at least a respective first wheel 28a, 30a of each of the first and second plurality of wheels 28, 30 is positioned to frictionally engage the respective interior side 23, 24 of the first and second planar elements 20, 22. A respective second wheel 28b, 30b of each of the first and second plurality of wheels 28, 30 is positioned to frictionally engage the respective exterior side 25, 26 of the first and second planar elements 20, 22. The guide arrangement 14 may have a similar construction as that of rail arrangement 12, in that the guide arrangement 14 also includes two substantially planar elements that form a V-shaped design. The first and second plurality of wheels 28, 30 are respectively mounted on these two planar elements. Accordingly, as partially depicted in FIG. 3, the first planar element 20 is situated between the first and second wheel 28a, 28b of the first plurality of wheels 28 and the second planar element 22 is situated between the first and second wheel 30a, 30b of the second plurality of wheels 30.

In a desirable embodiment, the guide arrangement 14 utilizes eight wheels (e.g., 50 mm or less polyurethane wheels) or similar implements providing stable and smooth, quiet rotational movement. The wheels provide a sufficient amount of friction to keep the camera 18 from slipping, yet are soft enough to absorb any play of the guide arrangement 14. The wheels are positioned such that when the guide arrangement 14 is assembled with the rail arrangement 12, six of the wheels are situated within the V-shape portion of the rail arrangement 12 and two wheels are situated outside of the rail arrangement 12. This arrangement provides for a high degree of stability, however, it is to be understood that other suitable wheel arrangements may be utilized. The two outside wheels may cut for slide adjustments in order to account for differences in the thickness (e.g., due to wear) in the first and second planar elements 20, 22. The six inside wheels are positioned such that when the camera tilts up or down, the guide arrangement 14 does not tilt with it, thus preventing unintended movement in the guide arrangement 14 that would affect shooting stability. The wheels may be attached with any suitable fasteners, such as bolts. Of the six bolts holding the eight wheels, two of the bolts may hold two wheels each in order to keep the guide arrangement 14 from slipping.

The planar elements of the guide arrangement 14 may each include a slot 32 or other suitable mechanism for adjusting the distance of the respective second wheel 28b, 30b in relation to the respective first and second planar elements 20, 22. For example, a wing nut (not shown) may be used to secure the axle of the second wheel 28b within a slot 32. By loosening the wing nut and then urging the axle within the slot 32 toward the first planar element 20, and then retightening the wing nut, the frictional resistance against the first planar elements 20 by the second wheel 28b has been adjustingly increased, thereby retarding the fluid movement of the guide arrangement 14 along the rail arrangement 12. Additionally, any one of the wheels may include a brake mechanism to prevent movement of the guide arrangement 14 along the rail arrangement 12. For example, a finger-tightened bolt may screw down into one of the wheels, thereby functioning as a brake or lock-off preventing any movement to the guide arrangement 14. Also, the rail arrangement 12 may include a stop 33 (e.g., rubber stopper) attached to the first or second planar elements 20, 22 to prevent at least one of the wheels of the first or second plurality of wheels 28, 30 from moving past an end of the rail arrangement 12. Furthermore, it is to be understood that additional wheels may be added, as necessary to provide additional support across various lengths of guide arrangements. In one embodiment, the angle defined between the first planar element 20 and the second planar element 22 is substantially 90 degrees. Thus, the two planar elements of the guide arrangement 14 are substantially perpendicular to the respective first planar element 20 and the second planar element 22. The aforementioned configuration allows for smooth and controlled movement of the camera 18 along a linear path, which is conducive to improved film-making.

Figure 4:
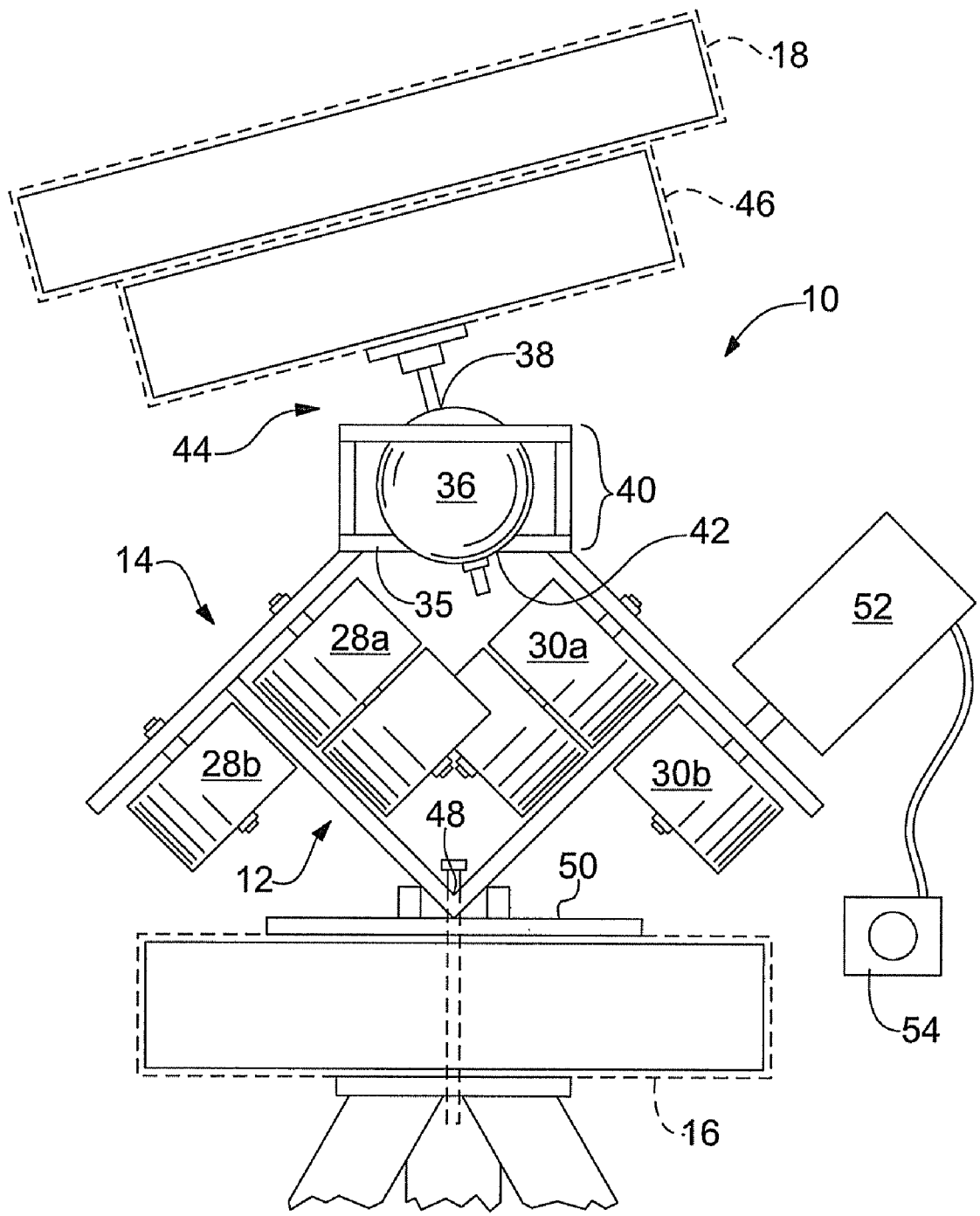
FIG. 4 is a front plan schematic view of the connectivity among various components of the film camera dolly.

The guide arrangement 14 may include hardware for securing the camera 18 to the guide arrangement 14. For example, a throughbore 34 may be defined within an area where the planar sections of the guide arrangement 14 are joined. The planar sections of the guide arrangement 14 may also be joined by a substantially planar bridging element 35. Another example of hardware that may be utilized to attach the camera 18 to the guide arrangement 14 includes a ball leveling mount, as shown in FIG. 4. The ball leveling mount includes a substantially spherical element (e.g., 3" steel ball bearing) 36 having a throughbore 38 or threaded hole defined therein (e.g, drilled hole for accommodating a tie down screw from a Satchler tripod head). The ball leveling mount also includes a ball and socket arrangement 40 for allowing rotational movement of the spherical element 36. The ball and socket arrangement 40 includes a beveled hole 42 (e.g., 2") defined within the planar bridging element 35 and sized to receive a portion of the spherical element 36. A compression inducing means 44 (e.g., a plate with a beveled hole secured to the bridging element with adjustable bolts) may be utilized to hold the spherical element 36 within the beveled hole 42 by applying frictional force against the spherical element 36. The compressing inducing means 44 may be adjusted to increase or decrease the moving resistance on the spherical element 36. Accordingly, the camera 18 with a head control 46 (for providing pan tilt functionality) attached to the spherical element 36 is able to be positioned level when the film camera dolly 10 is not situated on level ground, when an inclined shot is desired, or when any other off-axis dolly move is made. Alternatively, a Mitchell Plate Adapter may be mounted in place of the ball and socket arrangement 40 and the compression inducing means 44 to allow for heavier camera setups (e.g., 2575 O'Conner Heads).

Figure 5:
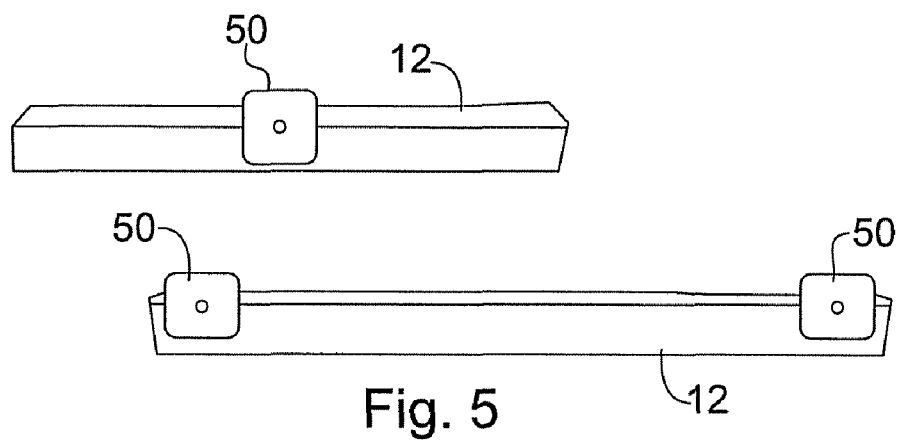
FIG. 5 is a top plan view of a shorter and longer length rail arrangement having bases attached along various points thereof.

As previously indicated, the rail arrangement 12 may be attached to the tripod 16. For example, the rail arrangement 12 may include one or more holes 48 (e.g., at both ends, in the middle and an end, or a combination thereof) or a groove extending along the length of the rail arrangement 12 for securing a base 50 thereto. As shown in FIG. 5, the base 50 may be situated and secured anywhere along the rail arrangement 12 via pre-drilled holes and corresponding fasteners. The base 50 may be secured to the tripod 16 by a fastener having threads corresponding to those of the tripod 16. For example, both the rail arrangement 12 and the base 50 may be attached by a ⅜" threaded bolt that continues down through the tripod 16 for stability. Depending on the placement of the rail arrangement 12, additional bases may be secured thereto. For example, the rail arrangement 12 may be used across sawhorses, two chairs, two C-stands, another dolly, or two tripods. The base 50 may be embodied as a 6" by 6" aluminum plate having supports for centering the rail arrangement 12. However, it is to be understood that the base 50 may be of different configurations depending on the application of use or support with which the base 50 is used.

In a further embodiment, as shown in FIG. 4, the dolly 10 may include an electrical motor 52 configured to impart rotational movement on at least one of the wheels of the first plurality of wheels or the second plurality of wheels 28, 30. For example, the electrical motor 52 may be directly connected to an axle of the wheel 30b. An actuator 54 may be wired or wireless connected to the electrical motor 52 to transmit electrical signals thereto representative of a predetermined rotational movement of the wheel to which the electrical motor 52 is connected.

Desirably, the rail arrangement 12 and the guide arrangement 14 are constructed of lightweight material, such as ¾" aluminum, in order to reduce the weight of the dolly 10 and its cost, but maintain the durability and workability (e.g., bending) associated with the metal. Other suitable materials may include steel for added strength or magnesium for lessened weight. As shown in FIG. 5, the rail arrangement 12 may be of variable lengths (e.g., 4 feet, 24 feet, etc.). It is envisioned that one may combine another rail arrangement with the rail arrangement 12, via appropriate linking, to provide smooth, continuous movement across extended distances. Use of multiple linkable rail arrangements is conducive to quick assembly and stowing of the dolly 10. Furthermore, other rail arrangements may be curved to provide smooth curved camera moves, not unlike that provided for by traditional curved dolly tracks.

The dolly 10 offers versatility in the adjustments and modifications that are able to be made thereto to accommodate the slider for various applications. Adjustments that may be made include, but are not limited to, placing Baby Spuds or Jr. Spuds such that they stick out below the base 50 to accommodate C-stands and Combo Stands for support.

The dolly 10 may be powder coated or painted (e.g., matte black) to minimize light reflections. Furthermore, the dolly 10 may be modified to accommodate a wire and pulley and counterbalance system to allow for a single tripod setup using heavier cameras. For example, when the camera 18 is moved in one direction, a weight, pulled by a wire, may travel in another direction. In an alternative embodiment, a rope pulley system may be rigged to direct the guide back and fourth by hand from afar.

The invention has been described with reference to the desirable embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A film camera dolly comprising:
a rail arrangement having a first substantially planar element and a second substantially planar element positioned in an angled relation to each other, wherein the first and second planar elements each have a respective interior and exterior side; and
a guide arrangement having a first plurality of wheels and a second plurality of wheels positioned in an angled relation to each other, wherein at least a respective first wheel of each of the first and second plurality of wheels is positioned to frictionally engage the respective interior side of the first and second planar elements, wherein at least a respective second wheel of each of the first and second plurality of wheels is positioned to frictionally engage the respective exterior side of the first and second planar elements, wherein the first planar element is situated between the first and second wheel of the first plurality of wheels and the second planar element is situated between the first and second wheel of the second plurality of wheels, wherein a respective third wheel of each of the first and second plurality of wheels is positioned to frictionally engage the respective interior side of the first and second planar elements, wherein the guide arrangement includes a third substantially planar element and a fourth substantially planar element having the first and second plurality of wheels respectively mounted thereon.

2. The film camera dolly of claim 1, wherein the guide arrangement includes means for securing a camera thereto.

3. The film camera dolly of claim 2, wherein the means for securing a camera includes a throughbore defined within an area where the third and fourth planar elements are joined.

4. The film camera dolly of claim 2, wherein the third and fourth planar elements include a substantially planar bridging element joining the third planar element to the fourth planar element.

5. The film camera dolly of claim 4, wherein the means for securing the camera includes:
a substantially spherical element having a throughbore or threaded hole defined therein; and
a ball and socket arrangement for allowing rotational movement of the spherical element.

6. The film camera dolly of claim 5, wherein the ball and socket arrangement comprises:
a hole defined within the planar bridging element and sized to receive a portion of the spherical element; and
compression inducing means for holding the spherical element within the hole and adapted to apply frictional force against the spherical element.

7. The film camera dolly of claim 1, wherein the third and fourth planar elements each include means for adjusting the distance of the respective second wheel in relation to the respective first and second planar elements, whereby the frictional resistance thereagainst by the respective second wheel is adjustable.

8. The film camera dolly of claim 1, wherein at least one of the wheels of the first or second plurality of wheels includes means for selectively stopping the rotational movement thereof.

9. The film camera dolly of claim 1, wherein the rail arrangement includes means for attaching a tripod thereto.

10. The film camera dolly of claim 9, wherein the rail arrangement includes one or more holes or a groove extending along the length of the rail arrangement for securing a base thereto.

11. The film camera dolly of claim 1, further comprising a base secured to the exterior side of the first and second planar elements.

12. The film camera dolly of claim 11, wherein the rail arrangement includes another base secured to the exterior side of the first and second planar elements.

13. The film camera dolly of claim 1, wherein the rail arrangement includes at least one stop attached to the first or second planar elements to prevent at least one of the wheels of the first or second plurality of wheels from moving past an end of the rail arrangement.

14. The film camera dolly of claim 1, wherein the angle defined between the first planar element and the second planar element is substantially 90 degrees, and wherein the third planar element and the fourth planar element is substantially perpendicular to the respective first planar element and the respective second planar element.

15. The film camera dolly of claim 1, further comprising an electrical motor configured to impart rotational movement on at least one of the wheels of the first plurality of wheels or the second plurality of wheels.

16. The film camera dolly of claim 15, further comprising an actuator wired or wirelessly connected to the electrical motor to transmit electrical signals thereto representative of a predetermined rotational movement of the at least one of the wheels of the first plurality of wheels or the second plurality of wheels.

* * * * *

UNITED STATES PATENT AND TRADEMARK OFFICE
CERTIFICATE OF CORRECTION

| | | |
|---|---|---|
| PATENT NO. | : 7,878,123 B2 | Page 1 of 1 |
| APPLICATION NO. | : 12/102671 | |
| DATED | : February 1, 2011 | |
| INVENTOR(S) | : Jackson | |

It is certified that error appears in the above-identified patent and that said Letters Patent is hereby corrected as shown below:

<u>Title of the Patent</u>, See Item (56) References Cited, U.S. PATENT DOCUMENTS, Column 2, insert the following:

-- 5,558,022    *    09/1996    Mason ............................ 104/126 --

Signed and Sealed this
Seventh Day of June, 2011

David J. Kappos
*Director of the United States Patent and Trademark Office*